(12) United States Patent
Obermaier et al.

(10) Patent No.: US 6,819,627 B2
(45) Date of Patent: Nov. 16, 2004

(54) METHOD FOR STORING DATA, METHOD FOR READING DATA, APPARATUS FOR STORING DATA AND APPARATUS FOR READING DATA

(75) Inventors: Werner Obermaier, Munich (DE); Andreas Bänisch, Munich (DE); Sabine Kling, Grub (DE)

(73) Assignee: Infineon Technologies AG, München (DE)

( * ) Notice: Subject to any disclaimer, the term of this patent is extended or adjusted under 35 U.S.C. 154(b) by 0 days.

(21) Appl. No.: 10/602,403

(22) Filed: Jun. 23, 2003

(65) Prior Publication Data

US 2004/0049485 A1 Mar. 11, 2004

(30) Foreign Application Priority Data

Jun. 24, 2002 (DE) .......................................... 102 28 128

(51) Int. Cl.[7] ................................................. G11C 8/00
(52) U.S. Cl. ................................. 365/238.5; 365/230.03
(58) Field of Search ......................... 365/238.5, 230.03, 365/235

(56) References Cited

U.S. PATENT DOCUMENTS 5,794,228 A * 8/1998 French et al. ................... 707/2

FOREIGN PATENT DOCUMENTS

| WO | WO 00/77615 A2 | 12/2000 |
| WO | WO 01/80000 A2 | 10/2001 |

* cited by examiner

*Primary Examiner*—Son T. Dinh
(74) *Attorney, Agent, or Firm*—Jenkins, Wilson & Taylor, P.A.

(57) ABSTRACT

The invention relates to two methods for reading and two methods for storing data, and also to an apparatus for compressing data and decompressing data which are provided for storage by a computer system 51 on a bulk memory 60 of the random access type, which computer system provides the data for storage on a bulk memory on the basis of the rules of a file system, where the data are organized in data blocks, where the data blocks contain organization information for managing the data blocks and contain the user information which is to be stored, where cohesive user information areas can be distributed over a plurality of data blocks which are then concatenated to one another using their organization information.

33 Claims, 3 Drawing Sheets

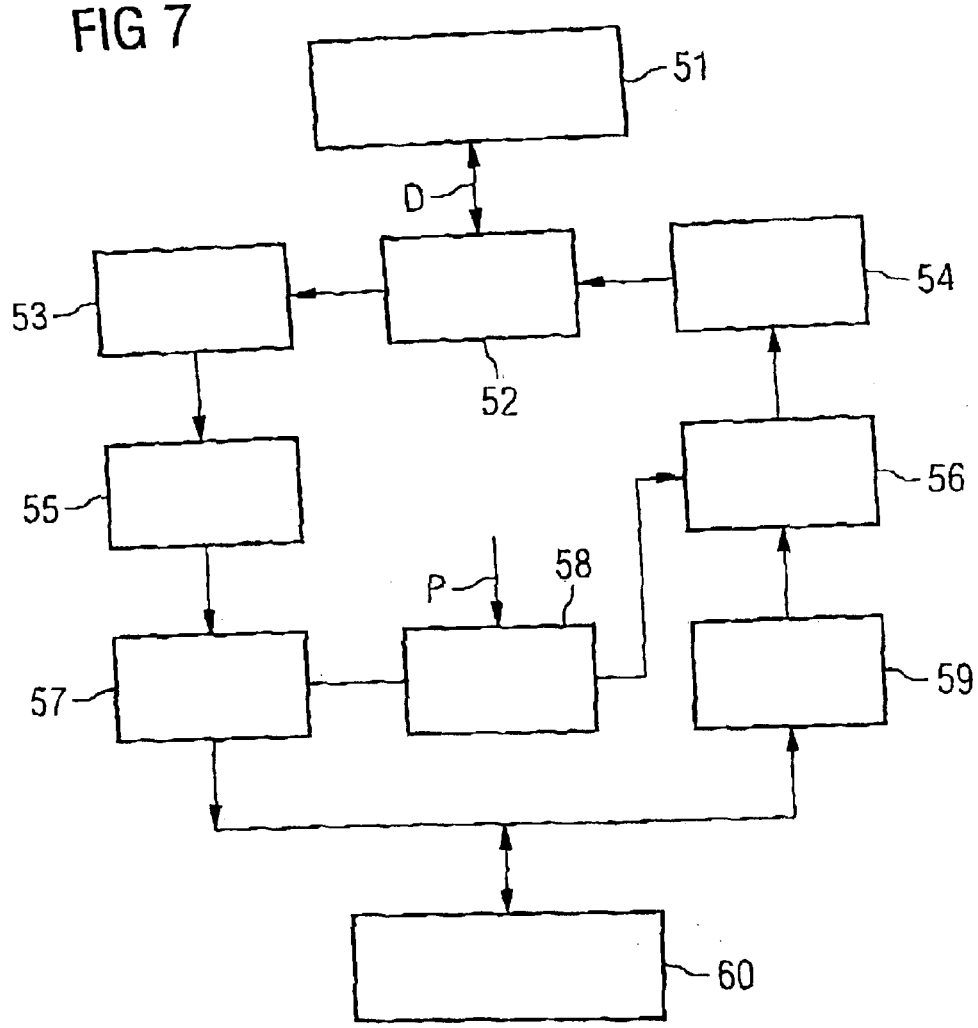

METHOD FOR STORING DATA, METHOD FOR READING DATA, APPARATUS FOR STORING DATA AND APPARATUS FOR READING DATA

TECHNICAL FIELD

The invention relates to a method for reading and a method for storing data in accordance with the precharacterizing part of claims 1 and 2 and claims 11 and 12, and also to an apparatus for compressing data and decompressing data in accordance with the precharacterizing part of claims 21 and 28.

BACKGROUND ART

In modern computer systems, ever more complicated and more powerful applications demand ever more storage space on the bulk memories associated with computer systems. In this context, these bulk memories need to permit fastest possible data access in order not to act as a bottleneck with regard to the performance of the computer system at this point. With a very high data storage requirement, the use of bulk memories permitting random access is therefore desirable.

However, the available capacities of the bulk memories in an ordinary computer system are limited, which means that applications or data bases requiring a lot of memory need to be relocated with some complexity in order to cover the continually rising storage space requirement.

SUMMARY OF THE INVENTION

It is an object of the invention to provide methods for storing and methods for reading data and also an apparatus for compressing data and an apparatus for decompressing data, in which the conventional bulk memories and computer systems are used, but where much larger volumes of data can be stored.

This object is achieved by a method for storing data in accordance with claim 1 and in accordance with claim 2, by a method for reading data in accordance with claim 11 and in accordance with claim 12, and by an apparatus for compressing data in accordance with claim 21 and an apparatus for decompressing data in accordance with claim 28.

The method for storing data on a bulk memory using a computer system, where the computer system supplies the data to the bulk memory for storage on the basis of the rules of a file system, where the bulk memory is of the random access type, in which the data are organized in data blocks, where the data blocks are provided for storage on the bulk memory on the basis of the rules of a file system on a computer system supplying the data, where the data blocks contain organization information for managing the data blocks and contain the user information which is to be stored, where cohesive user information areas can be distributed over a plurality of data blocks which are then concatenated to one another using their organization information, provides, in accordance with the invention, that the cohesive user information in one or more data blocks is separated from the organization information and is continuously compiled and, in a subsequent step, compressed using a data compression method, whereupon the compressed volume of data obtained in this manner is split into individual compressed-data packets preselected in terms of their data length, where the compressed-data packets are stored in compressed-data blocks with organization information for management on the bulk memory, organized on the basis of the rules of the file system on the computer system delivering the data, where a plurality of related compressed-data blocks are stored on the bulk memory with cohesive compressed data, distributed over a plurality of compressed-data blocks concatenated to one another using their organization information.

Another method for storing data on a bulk memory using a computer system, which computer system supplies the data to the bulk memory for storage on the basis of the rules of a file system, where the bulk memory is of the random access type, in which the data are organized in data blocks, where the data blocks are provided for storage on the bulk memory on the basis of the rules of a file system on a computer system delivering the data, where the data blocks contain organization information for managing the data blocks and contain the user information which is to be stored, where cohesive user information areas can be distributed over a plurality of data blocks which are then concatenated to one another using their organization information, provides, in accordance with the invention, that the data blocks, which are possibly concatenated to one another using their organization information, are continuously compressed using a data compression method to form a compressed volume of data on the basis of the concatenation before they are stored on the bulk memory, and the compressed volume of data obtained in this manner is split into individual compressed-data packets preselected in terms of their data length, where the compressed-data packets are stored on the bulk memory in compressed-data blocks with organization information for management, where a plurality of related compressed-data blocks are stored on the bulk memory with cohesive Compressed data, distributed over a plurality of compressed-data blocks concatenated to one another using their organization information.

The storage methods illustrated allow hitherto ordinary computer systems which are in use and their bulk memories to continue to be used. In this case, however, the compression achieves a much greater packing density for the data, which further extends the scope of application of the existing computer systems.

In accordance with one preferred method step, the data compression method used is a Huffmann, 1-Byterun, LhA, ZIP or RAR method. The use of compression algorithms which are already known makes the method transparent and opens it to a large number of applications and operating systems on computer installations.

In one advantageous method step, the data compression method is stored in a programmable program store provided for this purpose. This means that one and the same program store can also be used to retrieve the method upon decompression. In addition, the respective method to be used can be replaced flexibly.

In accordance with one advantageous method step, the data blocks provided by the computer system for storage on the bulk memory are first buffer-stored in a write memory. This means that timing problems with the computer installation requesting the data are prevented.

In accordance with one refinement of the method, the organization information is start, end and concatenation information (block pointer), particularly arranged at the start and end of a data block.

In one advantageous method step, the compressed-data blocks have the same structure as the data blocks. This produces the actual data structure on the bulk memory, which means that the step of decompression can also take place in the computer system.

In one particularly advantageous and therefore preferred method step, the bulk memory has a table holding information about the bulk memory's utilization by data blocks, this table being modified following use of the data compression method and storing on the [lacuna] data blocks with the compressed user information, or the compressed-data blocks [lacuna] the bulk memory being modified in line with their new length and/or number and/or memory position.

The inventive method for reading data from a bulk memory using a computer system, which computer system accesses the stored data in the bulk memory on the basis of the rules of a file system, which bulk memory is of the random access type, in which the data are organized in data blocks, where the data blocks are stored on the bulk memory on the basis of the rules of the file system on a computer system requesting the data, where the data blocks contain organization information, for managing the data blocks and contain the user information which is to be read, where cohesive user information areas can be distributed over a plurality of data blocks which are then concatenated to one another using their organization information, provides that the data blocks are read from the bulk memory, whereupon the cohesive user information in one or more data blocks is separated from the organization information and is continuously stored as related in a buffer store and, in a subsequent step, decompressed using a data decompression method, the decompressed user information is then split into uncompressed data blocks and is concatenated together on the basis of the rules of the file system with organization information about a read memory, and is provided for retrieval by the computer system.

Another method for reading data from a bulk memory using a computer system, which computer system accesses the stored data in the bulk memory on the basis of the rules of a file system, which bulk memory is of the random access type, in which the data are organized in data blocks, where the data blocks contain organization information for managing the data blocks and contain the user information which is to be read, where cohesive user information areas can be distributed over a plurality of data blocks which are then concatenated to one another using their organization information, provides, in accordance with the invention, that the data blocks are read from the bulk memory, whereupon the cohesive user information in one or more data blocks is separated from the organization information and is continuously stored as related, according to its concatenation, in a buffer store, where the user information is compressed compressed-data blocks whose structure is based on the rules of a file system and, in a subsequent step, is decompressed using a data decompression method, the decompressed data blocks structured on the basis of the rules of the file system on the computer system reading the data are then stored, organized on the basis of the rules of the file system, in a read memory for retrieval by the computer system.

This means that computer systems which have also been customary to date can continue to be used without needing to be converted for the inventive method.

In one refinement of the reading methods, the data compression method is a Huffmann, 1-Byterun, LhA, ZIP or RAR method.

In one preferred method step, the data compression method is stored in a programmable program store provided for this purpose.

Another method step advantageously provides that the data blocks provided by the computer system for storage on the bulk memory are first buffer-stored in a write memory.

Advantageously, the compressed-data blocks have the same structure as the data blocks.

Advantageously, the bulk memory has a table holding information about the bulk memory's utilization by data blocks, this table being modified following use of the data compression method and storing on the [lacuna] data blocks with the compressed user information, or the compressed-data blocks [lacuna] the bulk memory being modified in line with their new length and/or number and/or memory position.

The inventive apparatus for compressing data which are provided for storage by a computer system on a bulk memory of the random access type, which computer system provides the data for storage on a bulk memory on the basis of the rules of a file system, where the data are organized in data blocks, where the data blocks contain organization information for managing the data blocks and contain the user information which is to be stored, where cohesive user information areas can be distributed over a plurality of data blocks which are then concatenated to one another using their organization information, provides that a sorting device is provided which continuously compiles the data blocks, according to the order of the user information which is contained in the data blocks and is distributed over a plurality of data blocks, into a total data packet, and a compression device is provided which compresses the total data packet on the basis of a data compression method and splits the compressed data into data packets and stores these on the bulk memory as compressed-data blocks with organization information for management.

In one advantageous refinement of the invention, the sorting device, when compiling the total data packet, separates the organization information in the file system on the computer system and continuously compiles only the pure user data.

Advantageously, the compressed-data blocks' structure is organized on the basis of the rules of the file system on the computer system delivering the data.

In accordance with one refinement of the apparatus, a write memory is provided for buffer-storing the data blocks delivered by the computer system in the format of the file system.

Preferably, a method program store is provided in which the compression method for the compression device and/or the sorting code for the sorting device are stored.

Preferably, the bulk memory is a hard disk.

In accordance with another aspect of the invention, an apparatus for decompressing data which are stored on a bulk memory of the random access type, where the data are organized in data blocks, where the data blocks contain organization information for managing the data blocks and contain the user information which is to be stored, where cohesive user information areas can be distributed over a plurality of data blocks which are then concatenated to one another using their organization information, is distinguished in that a sorting device is provided which continuously compiles the data blocks, in accordance with the order of the user information which is contained in the data blocks and is distributed over a plurality of data blocks, into a total data packet, and a data compression device is provided which compresses the total data packet on the basis of a data compression method and splits the compressed data into data packets and stores these on the bulk memory as compressed-data blocks with organization information for management and concatenation thereof.

Advantageously when compiling the total data packet, the sorting device separates the organization information in the file system on the computer system and continuously compiles only the pure user data.

Advantageously, a write memory for buffer-storing the data blocks which are delivered by the computer system in the format of the file system is provided.

Preferably, a method program store is provided in which the compression method for the data compression device and/or the sorting code for the sorting device are stored. This means that the apparatus remains flexible, since the algorithm to be used can be altered. Accordingly, one refinement of the invention provides for the method program store to be reversibly programmable.

Preferably, the bulk memory is a hard disk and/or the apparatus is produced in the hard disk. This makes the advantages of the invention particularly noticeable.

The invention also relates to an apparatus for decompressing data which are stored on a bulk memory of the random access type, where the data are organized in data blocks, where the data blocks contain organization information for managing the data blocks and contain the user information which is to be stored, where cohesive user information areas can be distributed over a plurality of data blocks which are then concatenated to one another using their organization information, where a decompression device is provided which continuously compiles the data blocks, separating the organization information, following reading from the bulk memory in accordance with their user information which they contain, as related on the basis of the concatenation thereof, and the data are then decompressed on the basis of a data decompression method, and the decompressed data are stored in a read memory, provided for this purpose, for reading by a computer system.

In one advantageous refinement of the invention, the decompressed data are split into data packets, and these are stored in the read memory as data blocks with organization information for management, on the basis of the rules of the file system on the computer system retrieving the data, for reading by a computer system.

Advantageously, the apparatus is produced in a hard disk or in a hard disk controller.

Other advantages, peculiarities and expedient developments of the invention can be found in the further subclaims or in subcombinations thereof.

BRIEF DESCRIPTION OF THE DRAWINGS

The invention is explained in more detail below with reference to the drawing, in which:

FIG. 7 shows a schematic design for an apparatus in accordance with the invention.

DETAILED DESCRIPTION OF THE INVENTION

Identical references in the figures denote elements which are the same or have the same effect.

Figure 1:
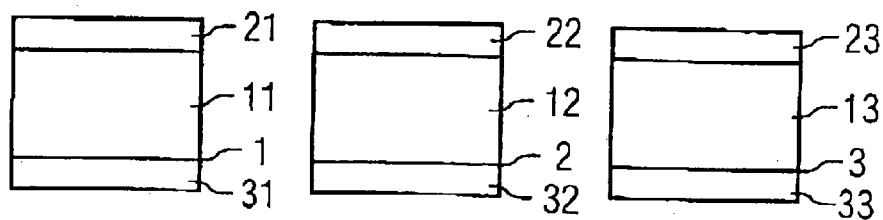
FIG. 1 shows a related group of three data blocks with uncompressed user information.
Figure 2:
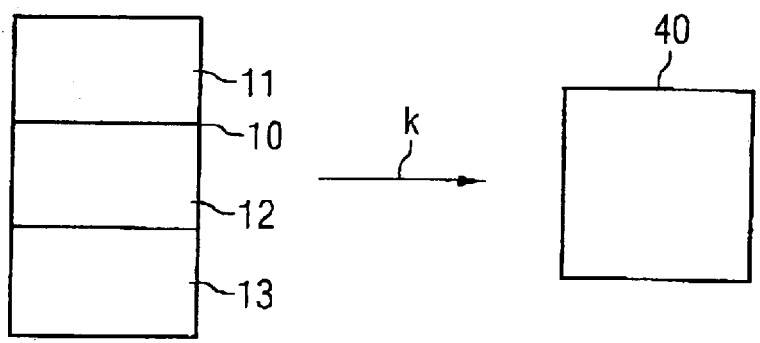
FIG. 2 shows a schematic compression sequence for the pure user information.
Figure 3:
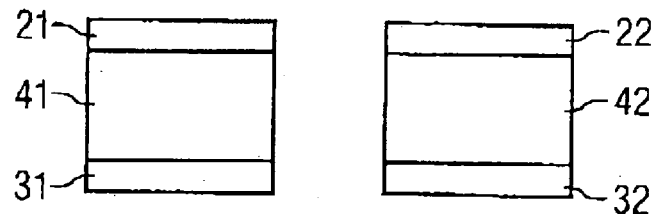
FIG. 3 shows two data blocks with compressed user information.

FIGS. 1 to 3 schematically show the alteration of data blocks when using the inventive storage method. FIG. 1 shows a related group of three data blocks 1, 2 and 3 with uncompressed user information 11, 12 and 13 on a bulk memory. In this case, the user information is too long for one block, which means that it has been split over three data blocks. The data blocks 1 are then concatenated to one another using their organization information at the start 21 and the end 31 of the data block. This is done using "block pointers". These block pointers respectively indicate at the end of the data block (or else all the information in an organization data area at the start of a data block) where on the bulk memory the next data block in relation to the user information is located. In this case, the user information is almost always uncompressed.

FIG. 2 shows the data state after the related user information 11, 12, 13 in the three data blocks has been separated from the organization information and has been continuously (10) compiled.

In the step of data compression (K), these data are then compressed, which reduces the volume of data.

FIG. 3 shows the result of the subsequent steps after the compressed volume of data obtained in this manner has been split into individual compressed-data packets 41 and 42 preselected in terms of their data length—for example a multiple of 1024 bytes—and this has been provided with organization information (21, 31 and 22, 32) in two compressed-data blocks. This organization information is required for managing the data blocks on the bulk memory and has been generated on the basis of the rules of the file system on the computer system delivering the data. The related compressed-data blocks with their cohesive compressed data (the user information) are in this case concatenated to one another using the organization information and can therefore be stored on the bulk memory in distributed form.

Figure 4:
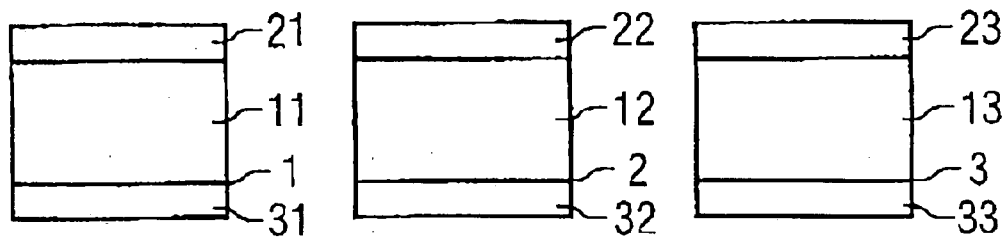
FIG. 4 shows a related group of three data blocks with uncompressed user information.
Figure 5:
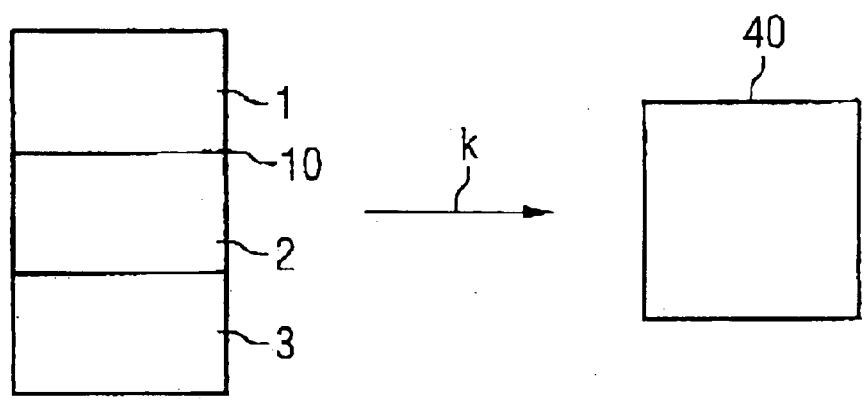
FIG. 5 shows a schematic compression sequence for the data blocks.
Figure 6:
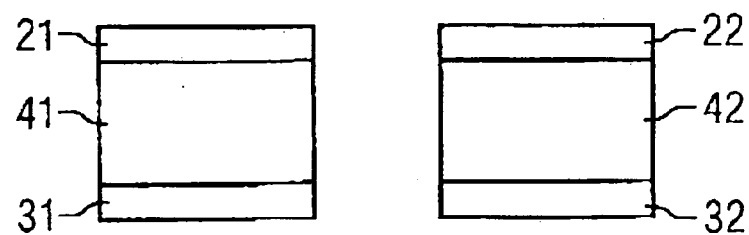
FIG. 6 shows two data blocks with compressed-data blocks as user information.

FIGS. 4 to 6 show the data or the data blocks following the second method for storing data on a bulk memory using a computer system.

As FIG. 5 shows, however, the data blocks 1 to 3 possibly concatenated to one another using their organization information are continuously compressed, in accordance with the concatenation, before they are stored on the bulk memory, as a whole with the organization information using a data compression method to form a compressed (K) volume of data 40. This compressed volume of data obtained in this manner is split into individual compressed-data packets preselected in terms of their data length. These compressed-data packets obtained in this manner are then converted into compressed-data blocks with organization information for management on the bulk memory (see FIG. 6).

The related compressed-data blocks with cohesive compressed data are thus again distributed over a plurality of compressed-data blocks concatenated to one another using their organization information and are stored on the bulk memory.

The data compression method used can be a Huffmann, 1-Byterun, LhA, ZIP or RAR method or any other compression method.

FIG. 7 schematically shows the design of an apparatus which can be used to perform compression (write operation) and decompression (read operation).

A computer system 51 delivers and requests the data D. These are conditioned such that they are suitable for communication with a commonly used bulk storage medium in the form of a hard disk.

First, an input/output apparatus 52 controls the flow of data. The data to be written—in the form of data blocks—are first supplied to the write memory 53, where they are stored.

The sorting device 55 continuously compiles the data blocks, in accordance with the order of the user information which is contained in the data blocks and is possibly distributed over a plurality of data blocks, to form a total data packet.

The data compression device 57 associated with the sorting device 55 compresses the total data packet on the basis of the data compression method stored in the program memory 58.

After that, the compressed data are split into data packets, and these are stored on the bulk memory 60 (hard disk) as compressed-data blocks with organization information for management and concatenation thereof.

It is naturally just as conceivable for packets first to be divided off, and for these then to be compressed; however, this would restrict the effectiveness for a prescribed block length.

The sorting device 55 can also, when compiling the total data packet, separate the organization information in the file system on the computer system and continuously compile only the pure user data. This then corresponds to the two variants of the write method described above.

In this case, the compressed-data blocks' structure can be organized on the basis of the rules of the file system on the computer system delivering the data. This has the advantage that these data could be read again by the computer system itself. However, it is also conceivable for quite different organization structures inherent to the apparatus to be used for this.

The program store 58 has the advantage that not just one compression method can be applied rigidly, but rather variable programming can be performed by means of external programming P.

For a read operation, the elements of the apparatus are activated as follows: first, the data blocks are read from the bulk memory 60, whereupon the cohesive user information in one or more data blocks is separated from the organization information and is continuously stored as related, in accordance with its concatenation, in the buffer store 59.

In the next step, the data decompression device 56 is used to decompress the user information using the data decompression method stored in the program store 58.

The decompressed data are made available to the computer system 51 for reading in a read memory 54.

In this case, the data are conditioned in data blocks based on the rules of the file system on the computer system reading the data—that is to say with corresponding organization information—and, organized on the basis of the file system, are stored in the read memory 54 for retrieval by the computer system.

In this context, the apparatus can be produced in the hard disk itself, or in the controller associated therewith, which allows the use of a commonly used computer system, on the one hand, and of a commercially available hard disk, on the other.

What is claimed is:

1. A method for storing data on a bulk memory using a computer system, which computer system supplies the data to the bulk memory for storage on the basis of the rules of a file system, which bulk memory is of the random access type, in which the data are organized in data blocks, where the data blocks are provided for storage on the bulk memory on the basis of the rules of a file system on a computer system supplying the data, where the data blocks contain organization information, arranged at the start and end of a data block, for managing the data blocks and contain the user information which is to be stored, where cohesive user information areas can be distributed over a plurality of data blocks which are then concatenated to one another using their organization information, where the related user information in one or more data blocks is separated from the organization information and is continuously compiled and, in a subsequent step, compressed using a data compression method, whereupon the compressed volume of data obtained in this manner is split into individual compressed-data packets preselected in terms of their data length, where the compressed-data packets are stored in compressed-data blocks with organization information for management on the bulk memory, organized on the basis of the rules of the file system on the computer system delivering the data, where a plurality of related compressed-data blocks are stored on the bulk memory with cohesive compressed data, distributed over a plurality of compressed-data blocks concatenated to one another using their organization information.

2. A method for storing data on a bulk memory using a computer system, which computer system supplies the data to the bulk memory for storage on the basis of the rules of a file system, which bulk memory is of the random access type, in which the data are organized in data blocks, where the data blocks are provided for storage on the bulk memory on the basis of the rules of a file system on a computer system delivering the data, where the data blocks contain organization information, arranged at the start and end of a data block, for managing the data blocks and contain the user information which is to be stored, where cohesive user information areas can be distributed over a plurality of data blocks which are then concatenated to one another using their organization information, where the data blocks, which are possibly concatenated to one another using their organization information, are continuously compressed using a data compression method to form a compressed volume of data on the basis of the concatenation before they are stored on the bulk memory, and the compressed volume of data obtained in this manner is split into individual compressed-data packets preselected in terms of their data length, where the compressed-data packets are stored on the bulk memory in compressed-data blocks with organization information for management, where a plurality of related compressed-data blocks are stored on the bulk memory with cohesive compressed data, distributed over a plurality of compressed-data blocks concatenated to one another using their organization information.

3. The method for storing data on a bulk memory as claimed in claim 1, wherein the data compression method used is a Huffmann, 1-Byterun, LhA, ZIP or RAR method.

4. The method for storing data on a bulk memory as claimed in claim 1, wherein the data compression method is stored in a programmable program store provided for this purpose.

5. The method for storing data on a bulk memory as claimed in claim 1, wherein the data blocks provided by the computer system for storage on the bulk memory are first buffer-stored in a write memory.

6. The method for storing data on a bulk memory as claimed in claim 1, wherein the organization information is start, end and concatenation information (block pointer).

7. The method for storing data on a bulk memory as claimed in claim 1, wherein the compressed-data blocks have the same structure as the data blocks in the file system.

8. The method for storing data on a bulk memory as claimed in claim 1, wherein the bulk memory has a table holding information about the bulk memory's utilization by data blocks, this table being modified following use of the data compression method and storing on the [lacuna] data blocks with the compressed user information, or the compressed-data blocks [lacuna] the bulk memory being modified in line with their new length and/or number and/or memory position.

9. The method for storing data on a bulk memory as claimed in claim 1, wherein the data blocks have fixed lengths of 1024 bytes or a multiple thereof.

10. The method for storing data on a bulk memory as claimed in claim 1, wherein the bulk memory is a hard disk.

11. A method for reading data from a bulk memory using a computer system, which computer system accesses the stored data in the bulk memory on the basis of the rules of a file system, which bulk memory is of the random access type, in which the data are organized in data blocks, where the data blocks are stored on the bulk memory on the basis of the rules of the file system on a computer system requesting the data, where the data blocks contain organization information, arranged at the start and end of a data block, for managing the data blocks and contain the user information which is to be read, where cohesive user information areas can be distributed over a plurality of data blocks which are then concatenated to one another using their organization information, where the data blocks are read from the bulk memory, whereupon the cohesive user information in one or more data blocks is separated from the organization information and is continuously stored as related, according to its concatenation, in a buffer store and, in a subsequent step, decompressed using a data decompression method, the decompressed user information is then split into uncompressed data blocks and is concatenated together on the basis of the rules of the file system with organization information about a read memory, and is provided for retrieval by the computer system in a read memory.

12. A method for reading data from a bulk memory using a computer system, which computer system accesses the stored data in the bulk memory on the basis of the rules of a file system, which bulk memory is of the random access type, in which the data are organized in data blocks, where the data blocks contain organization information, arranged at the start and end of a data block, for managing the data blocks and contain the user information which is to be read, where cohesive user information areas can be distributed over a plurality of data blocks which are then concatenated to one another using their organization information, where the data blocks are read from the bulk memory, whereupon the cohesive user information in one or more data blocks is separated from the organization information and is continuously stored as related, according to its concatenation, in a buffer store, where the user information is compressed compressed-data blocks whose structure is based on the rules of a file system and, in a subsequent step, is decompressed using a data decompression method, the decompressed data blocks structured on the basis of the rules of the file system on the computer system reading the data are then stored, organized on the basis of the rules of the file system, in a read memory for retrieval by the computer system.

13. The method for reading data from a bulk memory as claimed in claim 11, wherein the data compression method is a Huffmann, 1-Byterun, LhA, ZIP or RAR method.

14. The method for reading data from a bulk memory as claimed in claim 11, wherein the data compression method is stored in a programmable program store provided for this purpose.

15. The method for reading data from a bulk memory as claimed in claim 11, wherein the data blocks provided by the computer system for storage on the bulk memory are first buffer-stored in a write memory.

16. The method for reading data from a bulk memory as claimed in claim 11, wherein the organization information is start, end and concatenation information (block pointer), particularly arranged at the start and end of a data block.

17. The method for reading data from a bulk memory as claimed in claim 11, wherein the compressed-data blocks have the same structure as the data blocks.

18. The method for reading data from a bulk memory as claimed in claim 11, wherein the bulk memory has a table holding information about the bulk memory's utilization by data blocks, this table being modified following use of the data compression method and storing on the [lacuna] data blocks with the compressed user information, or the compressed-data blocks [lacuna] the bulk memory being modified in line with their new length and/or number and/or memory position.

19. The method for reading data from a bulk memory as claimed in claim 11, wherein the data blocks have fixed lengths of 1024 bytes or a multiple thereof.

20. The method for reading data from a bulk memory as claimed in claim 11, wherein the bulk memory is a hard disk.

21. An apparatus for compressing data which are provided for storage by a computer system on a bulk memory of the random access type, which computer system provides the data for storage on a bulk memory on the basis of the rules of a file system, where the data are organized in data blocks, where the data blocks contain organization information, arranged at the start and end of a data block, for managing the data blocks and contain the user information which is to be stored, where cohesive user information areas can be distributed over a plurality of data blocks which are then concatenated to one another using their organization information, where a sorting device is provided which continuously compiles the data blocks, according to the order of the user information which is contained in the data blocks and is distributed over a plurality of data blocks, into a total data packet, and a data compression device is provided which compresses the total data packet on the basis of a data compression method and splits the compressed data into data packets and stores these on the bulk memory as compressed-data blocks with organization information for management and concatenation thereof.

22. The apparatus for compressing data as claimed in claim 21, wherein the sorting device, when compiling the total data packet, separates the organization information in the file system on the computer system and continuously compiles only the pure user data.

23. The apparatus for compressing data as claimed in claim 21, wherein the compressed-data blocks' structure is organized on the basis of the rules of the file system on the computer system delivering the data.

24. The apparatus for compressing data as claimed in claim 21, wherein a write memory is provided for buffer-storing the data blocks delivered by the computer system in the format of the file system.

25. The apparatus for compressing data as claimed in claim 21, wherein a method program store is provided in which the compression method for the data compression device and/or the sorting code for the sorting device are stored.

26. The apparatus for compressing data as claimed in claim 25, wherein the method program store is reversibly programmable.

27. The apparatus for compressing data as claimed in claim 21, wherein the bulk memory is a hard disk and/or the apparatus is produced in the hard disk.

28. An apparatus for decompressing data which are stored on a bulk memory of the random access type, where the data are organized in data blocks, where the data blocks contain organization information, arranged at the start and end of a data block, for managing the data blocks and contain the user information which is to be stored, where cohesive user information areas can be distributed over a plurality of data blocks which are then concatenated to one another using their organization information, where a decompression device is provided which continuously compiles the data blocks, separating the organization information, following reading from the bulk memory in accordance with their user information which they contain, as related on the basis of the concatenation thereof, and the data are then decompressed on the basis of a data decompression method, and the decompressed data are stored in a read memory, provided for this purpose, for reading by a computer system.

29. The apparatus for decompressing data as claimed in claim 28, wherein the decompressed data are split into data packets, and these are stored in the read memory as data blocks with organization information for management, on the basis of the rules of the file system on the computer system retrieving the data, for reading by a computer system.

30. The apparatus for decompressing data as claimed in claim 28, wherein a method program store is provided in which the decompression method for the data decompression device is stored.

31. The apparatus for decompressing data as claimed in claim 30, wherein the method program store is reversibly programmable.

32. The apparatus for decompressing data as claimed in claim 28, wherein the bulk memory is a hard disk.

33. The apparatus for decompressing data as claimed in claim 28, wherein the apparatus is produced in a hard disk or in a hard disk controller.

* * * * *